Figure 1:
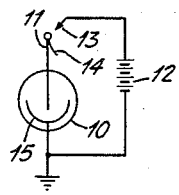

Feb. 2, 1937.  W. VAN B. ROBERTS  2,069,505
LIGHT MEASURING DEVICE
Filed Aug. 31, 1933

INVENTOR
WALTER VAN B. ROBERTS
BY
ATTORNEY

Patented Feb. 2, 1937

2,069,505

UNITED STATES PATENT OFFICE 2,069,505

LIGHT MEASURING DEVICE

Walter van B. Roberts, Princeton, N. J., assignor to Radio Corporation of America, a corporation of Delaware Application August 31, 1933, Serial No. 687,562

6 Claims. (Cl. 250—27.5)

This invention relates to light measuring devices such as are useful as photometers in astronomical work or as exposure meters in the taking of still or motion pictures. It has for its principal object the provision of an improved photometeric device and method of operation which make it possible to summate and indicate or measure with a high degree of accuracy an average illumination not measurable by ordinary instruments without amplification.

Another object is the provision of an improved photometric device which is capable of operating without the distortional effects introduced by vacuum tube amplifiers and the like.

In the various illustrated modifications of the invention, the cumulative effect of the illumination is transformed into electricity by means of a photoelectric device, and is measured in this state by an indicating element such as an electrometer, a glow discharge tube or a highly sensitive vacuum tube meter. These indicating elements may be utilized in connection with a chronometer or may be provided with an indicating scale. In certain modifications, a combined photoelectric tube and electrometer are provided for the purpose of minimizing or obviating electric leakage through the surrounding atmosphere. The various illustrated forms of the invention each operate to indicate or measure an illumination which has heretofore required amplification for its proper determination.

The invention will be better understood from the following description when considered in connection with the accompanying drawing and its scope will be pointed out in the appended claims.

Figure 5:
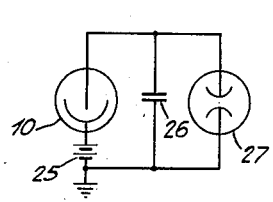
Figure 6:
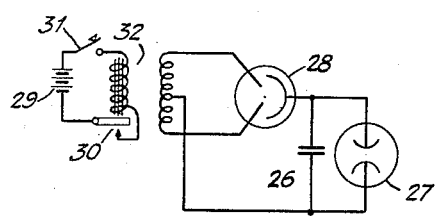
Figure 8:
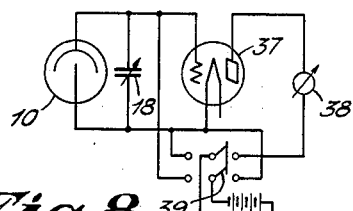
Figure 9:
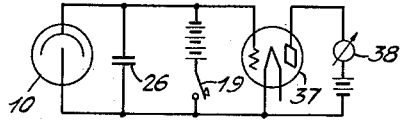
Figure 7:
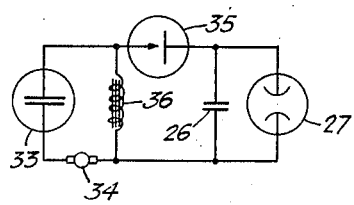
Figure 10:
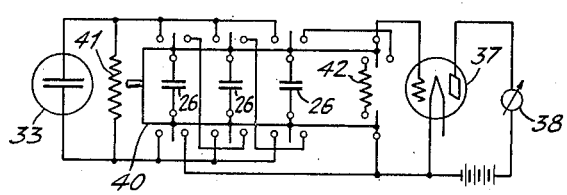

Referring to the drawing:

Figs. 1 to 4 illustrate various forms of the invention wherein a photoelectric tube is combined with an electroscope or electrometer for indicating or measuring the light received by the tube, Figs. 5, 6, and 7 illustrate photometric devices wherein a glow discharge tube is arranged to cooperate with a photoelectric device for producing electrical effects dependent on the illumination, and Figs. 8 to 10 illustrate forms of devices wherein a vacuum tube measuring instrument is utilized to indicate or measure the illumination received by a photoelectric device.

The device of Fig. 1 includes a photoelectric tube 10 and an electroscope 11 which are arranged to be connected to a battery 12 by a switch 13. A positive electric charge is imparted to the electroscope by closure of the switch and the leaf 14 is caused to assume the illustrated position and it tends to remain in this position after opening of the switch. The rate at which it returns to its normal position depends on how fast its positive charge is removed and this rate of removal is, in turn, dependent on the electrons released from the photoelectric cathode by the light received in the tube. It is therefore apparent that the time taken for the leaf 14 to assume its normal or discharged position is a direct measure of the intensity of the illumination at the window of the photoelectric tube. For photographic purposes, the photoelectric cathode 15 is exposed only to light coming from the object to be photographed, and, in some instances, only to light coming from a particular area of the object.

Figure 2:
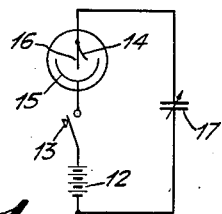

Fig. 2 shows the electroscope leaf 14 as suspended from the ungrounded anode 16 of the photoelectric device thus giving a combined photoelectric and electrometer tube. When the switch 13 is closed, the rate of charging depends upon the illumination, the capacities of the electrometer and condenser and leakage through the surrounding atmosphere. The tendency of leakage is to slow down the effect on the electrometer while the tendency of the condenser is to increase this effect. The indicated illumination will therefore tend to be more than the true value.

Figure 3:
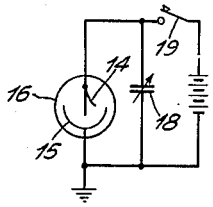

Fig. 3 shows a variable condenser 18 connected in parallel with the electrometer capacity. When the switch 19 is closed and opened, a charge proportional to the sum of the capacities of the electrometer and condenser is retained by the system. Hence a longer time will be required for a given illumination to produce a given decrease in the electrometer deflection. By noting the capacity of the condenser required to decrease the deflection a given amount in a given time, the condenser dial may be calibrated to read the proper exposure for a given type of film and diaphragm. The device of Fig. 3 tends to indicate less than the true illumination while the device of Fig. 2 tends to indicate more than the true illumination and the mean of the two values will be very nearly correct.

Figure 4:
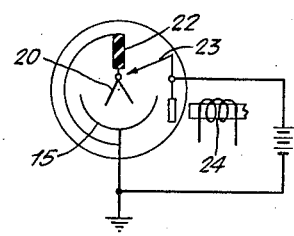

The device of Fig. 4 differs from those previously described in that the electrometer which forms the anode of the photoelectric device may be rendered altogether free of leakage. In this device, the electrometer 20 is supported in the evacuated tube by means including an insulator 22 which may be a sulphur rod. Also mounted within the evacuated tube is a switch 23 biased to its open position and arranged to be closed by an electromagnet 24 for imparting a charge to the electrometer. Under these conditions, the rate of deflection change is proportional to the illumination and may be indicated or measured in any suitable manner.

The device of Fig. 5 includes a photoelectric device 10 connected through a battery 25 to a parallel circuit comprising a condenser 26 and a glow discharge tube 27. In the operation of this device, the charging rate of the condenser is dependent on the illumination of the device 10 and is indicated by the frequency at which the condenser discharges through the glow tube, thereby producing a visible indication which may be readily observed and interpolated in terms of illumination units.

In order to reduce the weight of the battery required and render the apparatus more portable, a double anode photoelectric device 28 (see Fig. 6) may be provided, power being supplied to this device from a battery 29 through an interrupter 30 of any suitable type, a switch 31 and transformer 32. When the switch 31 is closed, the device 28 acts as a full wave rectifier and charges the condenser 26 up to the breakdown voltage of the glow tube 27 in a time depending on the illumination of the device 28.

It is desirable that the tube 27 have a low breakdown voltage and be made very low so that a small capacity C will be sufficient to make the discharge visible. For measurement, the incoming light may be reduced by a calibrated diaphragm to produce a flash per second, for example. The setting of the diaphragm then indicates the light value and for lower illumination, the seconds per flash may be counted.

The apparatus of Fig. 7 is similar to that of Fig. 6 with respect to the parallel circuit including the condenser 26 and the glow tube 27 but differs therefrom in that the comparatively large low voltage current of an electrolytic device 33 is supplied to the parallel circuit through an interrupter and a rectifier 35, a choke coil 36 being connected across the circuit intensifying the rectifier voltage.

In the devices of Figs. 8 to 10, a vacuum tube measuring instrument including a tube 37 and an indicator 38 is provided. The arrangement of Fig. 8 includes a two-way switch 39 which is closed to the left to charge the condenser 18 and to the right to apply voltage to the output circuit of the tube 37. Since the condenser is connected to the input circuit of the tube and its charge is dependent on the illumination of the device 10, it will be apparent that the output current of the tube 37 is a measure of the illumination. The same is true of the device of Fig. 9 which includes a switch 19 for applying a charge to the condenser 26 and that of Fig. 10 which includes a switch 40 for connecting a plurality of condensers 26 in parallel with each other and with a resistor 41 to an electrolytic device 33 and for connecting these condensers in series with one another to the input circuit of the tube 37. It will be understood that a resistor 42 may be connected in the tube input circuit when the condensers are disconnected therefrom and that other changes may be made without surrendering the advantages made possible by the invention.

Having thus described my invention, I claim:

1. A light responsive device comprising an electron emissive cathode including within an evacuated container, an anode insulated from said cathode and including means for measuring an electric charge, means mounted within said container for transmitting at will an electric charge to said measuring means, and means external to said container for controlling the operation of said charge connecting means.

2. A photometer including a light responsive device of the electron emitting type provided with an evacuated container, electric charge measuring means mounted within said container, and means mounted within said container for transmitting an electric charge to said measuring means.

3. The combination of a light responsive device including an evacuated container, a photoelectric cathode, an anode insulated from said cathode and including means operable to indicate the magnitude of an electric charge, and means mounted within said container for transmitting a positive charge to said anode.

4. The combination of a light responsive device of the electron emitting type including an evacuated container, a photoelectric cathode, an anode including means for measuring an electric charge and insulated from said cathode, and movable means mounted within said container for transmitting an electric charge to said anode.

5. A light responsive device comprising an evacuated container, an anode therein including means for measuring an electric charge, and a photoelectric cathode in said container.

6. A photo tube comprising a photo-electric cathode, an anode comprising an electroscope, and an evacuated container enclosing both of said elements.

WALTER van B. ROBERTS.